(12) United States Patent  (10) Patent No.: US 12,334,526 B2
Kuramitsu                (45) Date of Patent:     Jun. 17, 2025

(54) POWER STORAGE PACK (71) Applicant: Panasonic Intellectual Property Management Co., Ltd., Osaka (JP)

(72) Inventor: Kazuki Kuramitsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 666 days.

(21) Appl. No.: 17/633,978

(22) PCT Filed: Sep. 18, 2020

(86) PCT No.: PCT/JP2020/035650
§ 371 (c)(1),
(2) Date: Feb. 9, 2022

(87) PCT Pub. No.: WO2021/060222
PCT Pub. Date: Apr. 1, 2021

(65)                Prior Publication Data
US 2022/0320624 A1      Oct. 6, 2022

(30)       Foreign Application Priority Data

Sep. 26, 2019   (JP) ................................ 2019-176098

(51) Int. Cl.
*H01M 10/653*   (2014.01)
*H01G 11/10*    (2013.01)
(Continued)

(52) U.S. Cl.
CPC .......... *H01M 10/653* (2015.04); *H01G 11/10* (2013.01); *H01G 11/18* (2013.01);
(Continued)

(58) Field of Classification Search
None
See application file for complete search history.

(56)            References Cited

U.S. PATENT DOCUMENTS

2011/0189525 A1   8/2011  Palanchon et al.
2012/0141852 A1*  6/2012  Eberhard ............ H01M 50/593
                                                            429/98
(Continued)

FOREIGN PATENT DOCUMENTS

CA    2787507 A1   8/2011
CN  103098295 A    5/2013
(Continued)

OTHER PUBLICATIONS

JP2018006210a translation to English by Espacenet (Year: 2018).*
(Continued)

*Primary Examiner* — Jonathan G Leong
*Assistant Examiner* — Claire A Rutiser
(74) *Attorney, Agent, or Firm* — Rimon P.C.

(57)               ABSTRACT

A power storage pack includes a plurality of power storage modules each having a plurality of power storage devices arranged in first direction X and binding members that bind the plurality of power storage devices, and heat transfer members that transfer heat between the plurality of power storage modules. The plurality of power storage modules includes at least a first power storage module and a second power storage module. Each heat transfer member has first connecting parts thermally connected to a surface of the first power storage module, the surface being parallel with first direction X, second connecting parts thermally connected to a surface of the second power storage module, the surface being parallel with first direction X, and coupling parts thermally coupling the first connecting parts to the second connecting parts. The first connecting parts and the second connecting parts are arranged in such a way as to be shifted from each other in first direction X.

10 Claims, 5 Drawing Sheets

(51) Int. Cl.
  *H01G 11/18* (2013.01)
  *H01M 10/613* (2014.01)
  *H01M 10/647* (2014.01)
  *H01M 10/6554* (2014.01)
  *H01M 50/289* (2021.01)

(52) U.S. Cl.
  CPC ....... *H01M 10/613* (2015.04); *H01M 10/647* (2015.04); *H01M 10/6554* (2015.04); *H01M 50/289* (2021.01)

(56) References Cited

U.S. PATENT DOCUMENTS

| | | | |
|---|---|---|---|
| 2014/0038021 A1* | 2/2014 | Goesmann | H01M 10/625 429/120 |
| 2019/0267686 A1 | 8/2019 | Shimizu et al. | |
| 2020/0388801 A1 | 12/2020 | Omura | |

FOREIGN PATENT DOCUMENTS

| | | | |
|---|---|---|---|
| CN | 103296233 A | | 9/2013 |
| CN | 109478619 A | | 3/2019 |
| CN | 109690818 A | | 4/2019 |
| JP | 2012-181972 | | 9/2012 |
| JP | 2015-233017 | | 12/2015 |
| JP | 2018006210 A | * | 1/2018 |
| JP | 2019-046578 | | 3/2019 |
| WO | 2011/094863 | | 8/2011 |
| WO | 2018/012349 | | 1/2018 |
| WO | 2018/025567 | | 2/2018 |

OTHER PUBLICATIONS

International Search Report of PCT application No. PCT/JP2020/035650 dated Nov. 2, 2020.
English Translation of Chinese Office Action dated Mar. 1, 2023 for the related Chinese Patent Application No. 202080042076.4.

* cited by examiner

POWER STORAGE PACK

CROSS-REFERENCE TO RELATED APPLICATIONS

This application is a U.S. national stage application of the PCT International Application No. PCT/JP2020/035650 filed on Sep. 18, 2020, which claims the benefit of foreign priority of Japanese patent application No. 2019-176098 filed on Sep. 26, 2019, the contents all of which are incorporated herein by reference.

TECHNICAL FIELD

The present disclosure relates to a power storage pack.

BACKGROUND ART

As a power source required to output high voltage, the power source being for use in vehicles or the like, for example, a power storage module including a plurality of power storage devices (e.g., batteries) connected in series is known. In general, a power storage module includes a plurality of power storage devices, a plurality of separators each disposed between adjacent power storage devices, a pair of end plates disposed at both ends in the direction of arrangement of the power storage devices, and a bind bar put over the pair of end plates to bind the plurality of power storage devices in the direction of their arrangement. In general, a plurality of such power storage modules are housed in a housing, as a power storage pack, which is incorporated in a vehicle or the like (See, for example, PTL 1).

CITATION LIST

Patent Literature

PTL 1: Unexamined Japanese Patent Publication No. 2012-181972

SUMMARY OF THE INVENTION

In general, a power storage device may generate heat due to various factors. A power storage module including a plurality of power storage devices arranged therein has a risk of causing a chain of overheating, which results when the temperature of any given power storage device increases excessively and heat from that power storage device is transferred to an adjacent power storage device to increase its temperature excessively. The chain of overheating leads to a decline in the performance of the power storage module. In recent years, in particular, the capacities of power storage devices have been increasing, creating a tendency that the calorific value of the power storage devices increases as well. These circumstances have brought a strong demand for a measure against the declining performance of the power storage module that is caused by the chain of overheating.

The present disclosure has been conceived in view of such circumstances, and it is an object of the present disclosure to provide a technique for suppressing a decline in the performance of a power storage module.

An aspect of the present disclosure provides a power storage pack. The power storage pack includes: a plurality of power storage modules each including a plurality of power storage devices arranged in a first direction and a binding member that binds the plurality of power storage devices; and a heat transfer member that transfers heat between the plurality of power storage modules. The plurality of power storage modules includes at least a first power storage module and a second power storage module. The heat transfer member has a first connecting part thermally connected to a surface of the first power storage module, the surface being parallel with a first direction, a second connecting part thermally connected to a surface of the second power storage module, the surface being parallel with the first direction, and a coupling part thermally connecting the first connecting part to the second connecting part. The first connecting part and the second connecting part are arranged in such a way as to be shifted from each other in the first direction.

Any combination of the above constituent elements and modifications of what is described in the present disclosure in terms of method, device, system, and the like are also effective as aspects of the present disclosure.

According to the present disclosure, a decline in the performance of the power storage module can be suppressed.

DESCRIPTION OF EMBODIMENTS

The present disclosure will hereinafter be described on the basis of preferred exemplary embodiments, with reference to the drawings. The exemplary embodiments are not intended for limiting the present disclosure but are provided as examples, and all features described in the exemplary embodiments and combinations of the features are not always essential to the present disclosure. The same or similar constituent elements, members, or processes shown in the drawings are denoted by the same reference marks, and redundant descriptions will be omitted on a necessary basis. Scales and shapes of components shown in the drawings are determined for convenience so as to make description easy, and should not be interpreted as limit-placing elements unless otherwise specified. When such terms as "first" and "second" are used in the specification or claims, the terms do not represent any order or importance unless otherwise specified, and merely serve the purpose of distinguishing one constituent element from another constituent element. From each of the drawings, some of members not important for describing the exemplary embodiments are omitted.

First Exemplary Embodiment

Figure 1:
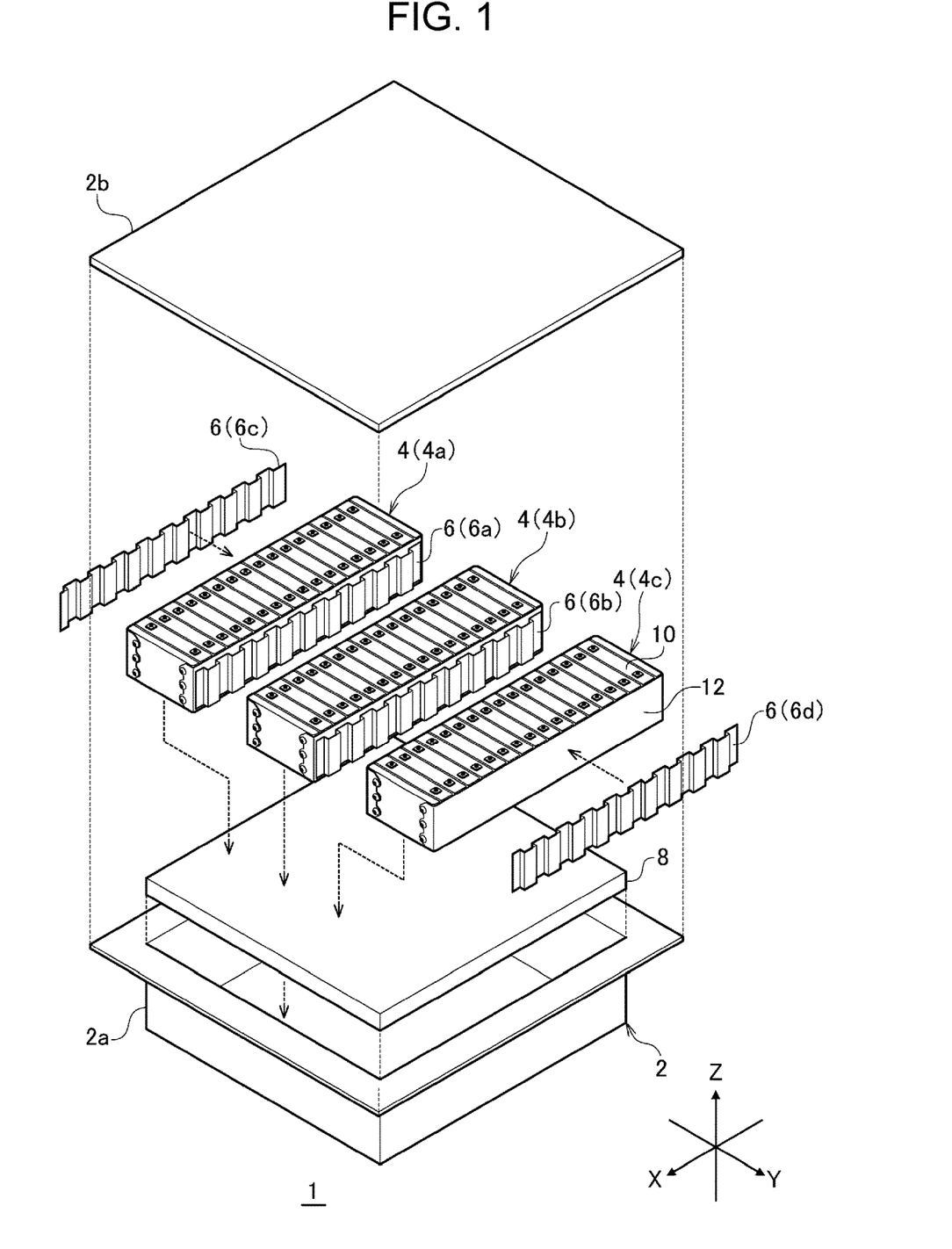
FIG. 1 is an exploded perspective view of a power storage pack according to a first exemplary embodiment.

FIG. 1 is an exploded perspective view of a power storage pack according to a first exemplary embodiment. Power storage pack 1 includes case 2, a plurality of power storage modules 4, heat transfer members 6, and cooling plate 8.

Case 2 includes case body 2a of a container with an opening, and lid 2b that closes the opening of case body 2a. Case body 2a houses the plurality of power storage modules 4, heat transfer members 6, and cooling plate 8. Case body 2a and lid 2b are fixed to each other by screwing or the like. Case 2 is fixed to an object to which case 2 is to be fitted, such as a vehicle body (not shown), by screwing or the like.

The plurality of power storage modules 4 include at least first power storage module 4a and second power storage module 4b. Power storage pack 1 of this exemplary embodiment includes third power storage module 4c, in addition to first power storage module 4a and second power storage module 4b. It should be noted that the number of power storage modules 4 is not limited to a specific number providing that the number is equal to or more than 2. In the following description, when distinguishing first power storage module 4a to third power storage module 4c from each other is unnecessary, they will be collectively referred to as power storage module 4 on a necessary basis.

Figure 2:
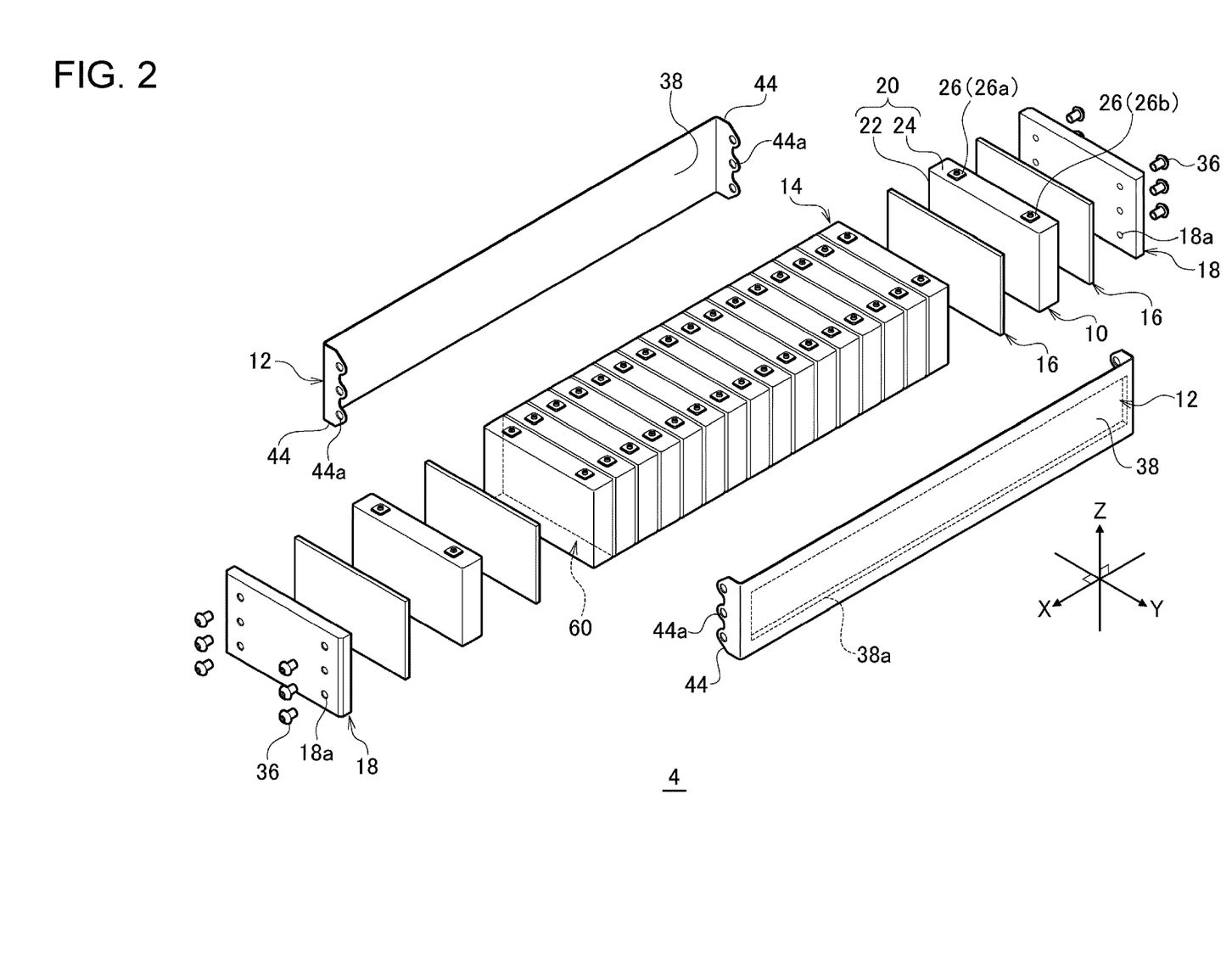
FIG. 2 is an exploded perspective view of a power storage module.

Each power storage module 4 has a structure in which a plurality of power storage devices 10 arranged in first direction X are bound by binding members 12. FIG. 2 is an exploded perspective view of power storage module 4. Power storage module 4 includes battery stack 14, and a pair of binding members 12. Battery stack 14 includes a plurality of power storage devices 10, a plurality of separators 16, and a pair of end plates 18.

Each power storage device 10 is, for example, a rechargeable secondary battery, such as a lithium ion battery, a nickel-hydrogen battery, and a nickel-cadmium battery, or a capacitor, such as an electric double layer capacitor. Power storage device 10 of this exemplary embodiment is a so-called square battery, and has housing 20 of a flat rectangular parallelepiped shape. Housing 20 is composed of exterior can 22 and sealing plate 24. Exterior can 22 has a substantially rectangular opening on its one surface, and through this opening, an electrode assembly, an electrolyte, and the like are put into exterior can 22. The electrode assembly has a structure in which sheets of positive electrodes, of negative electrodes, and of porous separators are stacked together. In this stacked structure, the porous separators are located between the positive electrodes and the negative electrodes, respectively. Each of the positive electrodes and of the negative electrodes has a lead extending from an end of the stacked structure toward a sealing material. This lead is connected to output terminal 26, which will be described later, directly or via a current collector. The electrode assembly may be a rolled assembly having a structure in which strip-shaped positive electrodes, strip-shaped negative electrodes, and strip-shaped separators are rolled together. Exterior can 22 may be covered with an insulating film, such as a shrink tube, which is not illustrated. Covering the surface of exterior can 22 with the insulating film can suppress short circuit between adjacent power storage devices 10 and short circuit between power storage device 10 and end plate 18, binding member 12, or cooling plate 8. The opening of exterior can 22 is closed with sealing plate 24 that seals exterior can 22.

Sealing plate 24 is provided with one output terminal 26 located closer to one end in the longitudinal direction of sealing plate 24, one output terminal 26 being electrically connected to the positive electrode of the electrode assembly, and with another output terminal 26 located closer to the other end of sealing plate 24, other output terminal 26 being electrically connected to the negative electrode of the electrode assembly. Hereinafter, output terminal 26 connected to the positive electrode will be referred to as positive electrode terminal 26a, while output terminal 26 connected to the negative electrode will be referred to as negative electrode terminal 26b. When distinguishing the pair of output terminals 26 from each other based on their polarity differences is unnecessary, positive electrode terminal 26a and negative electrode terminal 26b will be collectively referred to as output terminal 26. Exterior can 22 and sealing plate 24 are conductive, and are each made of metal, such as aluminum, iron, or stainless steel. Exterior can 22 and sealing plate 24 are joined together by, for example, laser welding, friction stir bonding, brazing, and the like. Exterior can 22 and sealing plate 24 may be made of a resin with insulating property.

Exterior can 22 has a bottom surface counter to sealing plate 24, and four side surfaces connecting the opening to the bottom surface. Two of the four side surfaces are a pair of long side surfaces connected respectively to two opposed long sides of the opening. Each of the long side surfaces is the largest surface among the entire surfaces of exterior can 22, that is, a main surface. The two side surfaces other than the two long side surfaces are a pair of short side surfaces connected to the opening of exterior can 22 and to short sides of the bottom surface.

For convenience, in the description of this exemplary embodiment, the bottom surface, the long side surfaces, and the short side surfaces of exterior can 22 are defined as the bottom surface, the long side surfaces, and the short side surfaces of housing 20 or power storage device 10. Sealing plate 24 is defined as a top surface of housing 20 or power storage device 10. In power storage module 4, top surfaces of power storage devices 10 are defined as a top surface of power storage module 4, bottom surfaces of power storage devices 10 are defined as a bottom surface of power storage module 4, and short side surfaces of power storage devices 10 are defined as side surfaces of power storage module 4. The top surface side of power storage module 4 is defined as an upper side in the vertical direction, and the bottom surface side of power storage module 4 is defined as a lower side in the vertical direction. These directions and positions are defined for convenience. It does not mean, therefore, that in the present disclosure, for example, a part defined as a top surface is always located above a part defined as a bottom surface. Sealing plate 24 is thus not necessarily located above the bottom surface of exterior can 22. In addition, in the following description, a direction in which two output terminals 26 are lined up is defined as second direction Y, and a direction in which the top surface and the bottom surface of power storage device 10 are lined up is defined as third direction Z. First direction X, second direction Y, and third direction Z are perpendicular to each other.

Sealing plate 24 is provided with a safety valve (not shown) disposed between the pair of output terminals 26. The safety valve is configured to open when an internal pressure of housing 20 rises to a given value or higher value, thus releasing an internal gas of housing 20 in such a situation. The safety valve is composed of a thin-walled part formed on a part of sealing plate 24, the thin-walled part being thinner than the other part, and a linear groove formed on the surface of the thin-walled part. In this configuration, a rise in the internal pressure of housing 20 causes the thin-walled part to start cleaving from the groove, thus opening the safety valve.

The plurality of power storage devices 10 are arranged at given intervals in first direction X such that the long side surfaces of adjacent power storage devices 10 are set counter to each other. Output terminals 26 of each power storage device 10 are arranged in such a way as to direct the same direction. In this exemplary embodiment, for convenience, output terminals 26 of each power storage device 10 are arranged in such a way as to direct upward in the vertical direction. Output terminals 26 of each power storage device 10, however, may be arranged in such a way as to direct directions different from each other.

Two adjacent power storage devices 10 are arranged (stacked) in such a way as to set positive electrode terminal 26a of one power storage device 10 adjacent to negative electrode terminal 26b of another power storage device 10. Positive electrode terminal 26a and negative electrode terminal 26b are connected in series via a bus bar (not shown). Alternatively, output terminals 26 of a plurality of power storage devices 10 adjacent to each other, output terminals 26 having the same polarity, may be connected in parallel by bus bars to form power storage device blocks, and these power storage device blocks may be connected in series.

Separator 16, which is referred to also as an insulating spacer, is of a plate shape and is disposed between opposed long side surfaces of two adjacent power storage devices 10 to electrically insulate two power storage devices 10 from each other. Separator 16 is made of, for example, a resin with insulating property. The resin making up separator 16 is, for example, a thermoplastic resin, such as polypropylene (PP), polybutylene terephthalate (PBT), polycarbonate (PC), and Noryl (registered trademark) resin (modified PPE). The plurality of power storage devices 10 and the plurality of separators 16 are stacked alternately. Separator 16 is disposed also between power storage device 10 and end plate 18. This insulates power storage device 10 and end plate 18 from each other.

The plurality of power storage devices 10 and the plurality of separators 16 arranged adjacent to each other are held between the pair of end plates 18 in first direction X. End plate 18 is made of, for example, a metal sheet or resin sheet. End plate 18 is provided with screw holes 18a which penetrates end plate 18 in first direction X and in which screws 36 are screwed.

The pair of binding members 12, which are referred to also as bind bars, are elongated members of which the longitudinal direction matches first direction X. The pair of binding members 12 are disposed in such a way as to face each other in second direction Y. Battery stack 14 is disposed between the pair of binding members 12. Each binding member 12 has body 38 and a pair of fixing parts 44.

Body 38 is a rectangular plate extending in first direction X. Body 38 extends in parallel to side surfaces of power storage devices 10. A surface of binding member 12 that is counter to battery stack 14 may be covered with an insulating sheet (not illustrated). The pair of fixing parts 44 are plates that project in second direction Y, respectively, from both ends in first direction X of body 38. The pair of fixing parts 44 are counter to each other in first direction X. Each fixing part 44 is provided with through-holes 44a through which screws 28 are inserted. The pair of fixing parts 44 fix binding member 12 to battery stack 14. Binding member 12 and end plate 18 may be fixed together by welding or the like.

Power storage module 4 is assembled, for example, in the following manner. The plurality of power storage devices 10 and the plurality of separators 16 are lined up alternately and are held between the pair of end plates 18 in first direction X. Hence battery stack 14 is formed. Battery stack 14 is sandwiched between the pair of binding members 12 in second direction Y. Each binding member 12 is positioned such that through-holes 44a are superposed on screw holes 18a of end plates 18. In this state, screws 36 are inserted through through-holes 44a and are screwed into screw holes 18a. The pair of binding members 12 are engaged with the pair of end plates 18 in this manner, thus binding the plurality of power storage devices 10. Battery stack 14 is thus fastened by binding members 12 as a given pressure is kept applied to battery stack 14 in first direction X. Being fastened by binding members 12 in first direction X, each power storage device 10 is positioned in first direction X.

For example, following completion of this positioning, bus bars are attached to output terminals 26 of each power storage device 10 to electrically connect output terminals 26 of the plurality of power storage devices 10 to each other. For example, the bus bars are fixed to output terminals 26 by welding. Then, the top surface of battery stack 14 is covered with a cover (not shown). The cover prevents dewdrops, dust, and the like from coming in contact with output terminals 26, the bus bars, the safety valves, and the like. The cover is made of, for example, a resin with insulating property, and can be fixed to the top surface of battery stack 14 by a known fixing structure (not shown) including screws and known locking mechanisms.

As shown in FIG. 1, each power storage module 4 is placed on cooling plate 8, with the bottom surface of power storage module 4 directing a main surface of cooling plate 8. According to this exemplary embodiment, first power storage module 4a, second power storage module 4b, and third power storage module 4c are arranged in this order in second direction Y, and are placed on cooling plate 8. Each power storage module 4 is fixed to cooling plate 8 by screwing or the like. Cooling plate 8 is fixed to case body 2a by screwing or the like. Cooling plate 8 may be omitted, in which case, each power storage module 4 is, for example, directly fixed to case body 2a.

Cooling plate 8 is a mechanism that cools the plurality of power storage modules 4. Cooling plate 8 is made of a material with heat transfer property, such as metal. Power storage devices 10 of each power storage module 4 are cooled through heat exchange with cooling plate 8. Cooling plate 8 may be provided with a refrigerant pipe (not shown) in which a refrigerant flows.

Heat transfer member 6 is a member that transfers (conducts) heat between a plurality of power storage modules 4. Heat transfer member 6 is made of a material with a heat transfer property, e.g., such a metal as aluminum. According to this exemplary embodiment, first heat transfer member 6a to fourth heat transfer member 6d and power storage modules 4 are lined up alternately and are housed in case 2. Specifically, third heat transfer member 6c, first power storage module 4a, first heat transfer member 6a, second power storage module 4b, second heat transfer member 6b, third power storage module 4c, and fourth heat transfer member 6d are lined up in this order in second direction Y. Third heat transfer member 6c is disposed between an inner side surface of case body 2a and first power storage module 4a, and fourth heat transfer member 6d is disposed between an inner side surface of case body 2a and third power storage module 4c.

First heat transfer member 6a transfers heat from first power storage module 4a to second power storage module 4b, and transfers heat from second power storage module 4b to first power storage module 4a. Second heat transfer member 6b transfers heat from second power storage module 4b to third power storage module 4c, and transfers heat from third power storage module 4c to second power storage module 4b. Third heat transfer member 6c transfers heat from first power storage module 4a to case body 2a. Fourth heat transfer member 6d transfers heat from third power storage module 4c to case body 2a. In the following description, when distinguishing first heat transfer member 6a to fourth heat transfer member 6d from each other is unnecessary, they will be collectively referred to as heat transfer member 6 on a necessary basis.

Heat transfer member 6 is fixed to body 38 of binding member 12 of power storage module 4 adjacent to heat transfer member 6, by bonding, screwing, or the like. When body 38 of binding member 12 has through-hole 38a (see FIG. 2), heat transfer member 6 may be fixed to power storage module 4 by fitting heat transfer member 6 into through-hole 38a. In this case, for example, first connecting parts 46 or second connecting parts 48 are fitted in through-hole 38a. Through-hole 38a is provided for the purpose of, for example, reducing the weight of binding member 12.

Heat transfer member 6 may be fixed to power storage module 4 by arranging a plurality of bodies 38 on each side surface of battery stack 14 of each power storage module 4 and holding heat transfer member 6 between adjacent bodies 38, that is, in other words, fitting a part of heat transfer member 6 into a gap between adjacent bodies 38. Such a structure is, for example, a structure in which a plurality of strip-shaped binding members 12 are arranged at intervals in third direction Z and heat transfer member 6 is fitted between binding members 12 adjacent to each other in third direction Z. Body 38 may be provided with a recess, in which a part of heat transfer member 6 may be fitted. Heat transfer member 6 may be fixed to end plates 18. Heat transfer member 6 may be fixed to case 2 or cooling plate 8.

Figure 3:
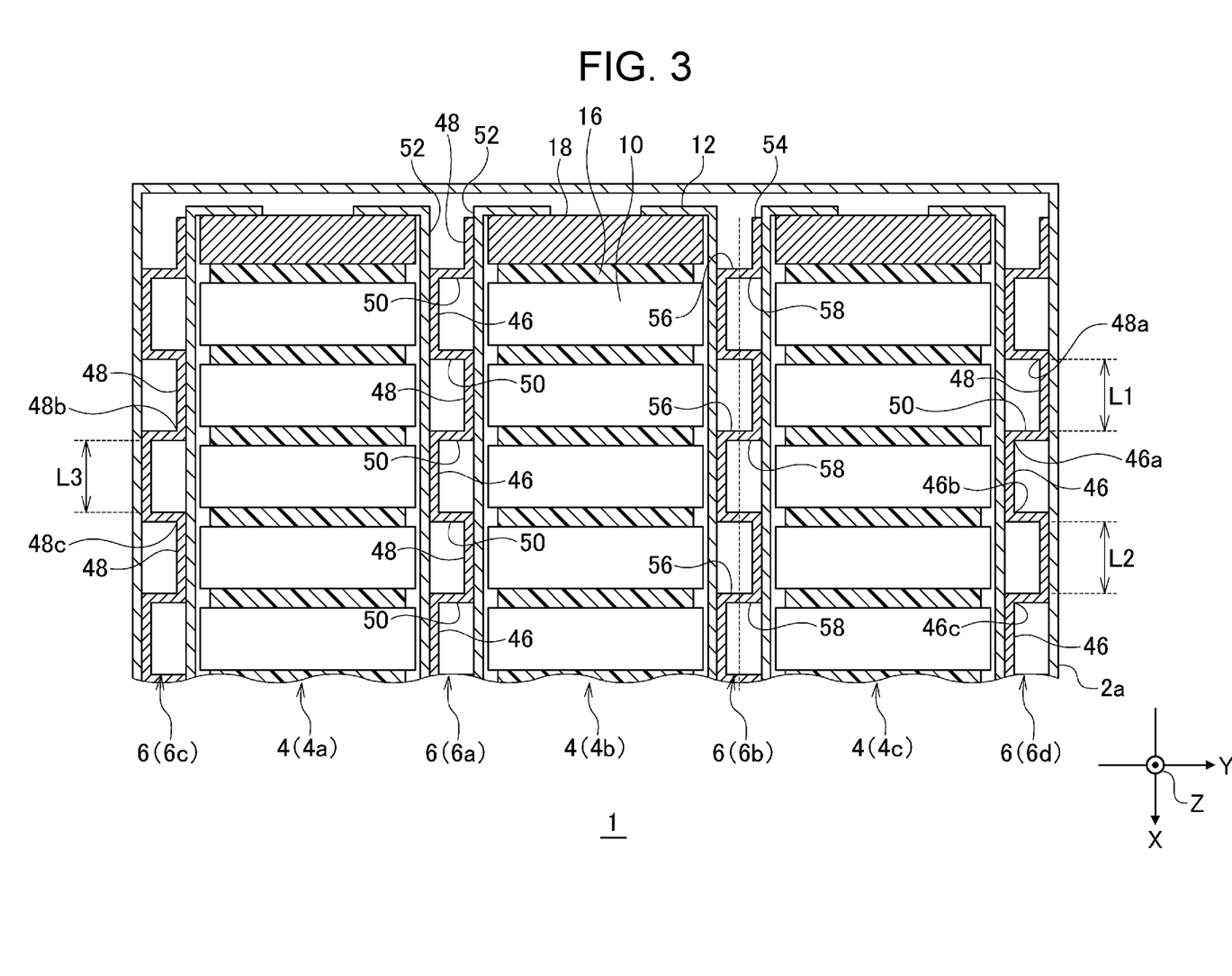
FIG. 3 is a horizontal cross-sectional view of a part of the power storage pack.

FIG. 3 is a horizontal cross-sectional view of a part of power storage pack 1. In FIG. 3, the internal structure of power storage devices 10 and separators 16 are illustrated in a simplified manner. First heat transfer member 6a has first connecting parts 46 thermally connected to first power storage module 4a, second connecting parts 48 thermally connected to second power storage module 4b, and coupling parts 50 thermally coupling first connecting parts 46 to second connecting parts 48.

First connecting parts 46 are thermally (heat-conductively) connected to a surface of first power storage module 4a that is parallel with first direction X. Second connecting parts 48 are thermally (heat-conductively) connected to a surface of second power storage module 4b that is parallel with first direction X. "thermally connected" includes not only the case of the connecting part being brought into direct contact with the power storage module but also a case of the connecting part being brought into indirect contact with the power storage module via a thermally conductive sheet, a thermally conductive adhesive, or the like.

First connecting parts 46 and second connecting parts 48 are arranged in such a way as to be shifted from each other in first direction X. Because of this arrangement, if any one power storage device 10 of first power storage module 4a overheats to raise its temperature excessively, the heat of this power storage device 10 is transmitted through first connecting part 46, coupling part 50, and second connecting part 48, to a part of second power storage module 4b, the part being separated away from this overheating power storage device 10 in first direction X. In this manner, the heat of overeating power storage device 10 can be diffused to power storage devices 10 different from adjacent power storage devices 10 or to adjacent power storage module 4. This suppresses a chain of overheating.

According to this exemplary embodiment, first connecting parts 46 and second connecting parts 48 are arranged in such a way as to be shifted from each other by an interval equal to or larger than one power storage device. This increases heat-dissipating paths, thus allowing quick diffusion of the heat of overheating power storage device 10. The above phrase "shifted from each other by an interval equal to or larger than one power storage device" means that, in a positional relationship between first connecting part 46 and second connecting part 48 adjacent to each other in first direction X, second connecting part 48 does not overlap power storage device 10 of first power storage module 4a, power storage device 10 being thermally connected to first connecting part 46, and power storage device 10 of second power storage module 4b, power storage device 10 being adjacent to power storage device 10 of first power storage module 4a in second direction Y, in a view in second direction Y. For example, in the positional relationship between first connecting part 46 and second connecting part 48 adjacent to each other in first direction X, interval L1 between one end 46a of first connecting part 46 and one end 48a of second connecting part 48 in first direction X is equal to or larger than the size (thickness) of one power storage device 10 in first direction X. Alternatively, a distance between two adjacent first connecting parts 46 is equal to or larger than the size of one power storage device 10 in first direction X. It is preferable that a dimension of coupling part 50 in first direction X be smaller than an interval between adjacent power storage devices 10. In this configuration, heat transfer between adjacent power storage devices 10 can be suppressed more certainly. First connecting part 46 and second connecting part 48 adjacent to each other in first direction X are first connecting part 46 and second connecting part 48 that are connected by one coupling part 50. End 46a and end 48a are ends on the same side in first direction X. Specifically, in the case of first connecting part 46 and second connecting part 48 adjacent to each other, when end 46a of first connecting part 46 is an end on the side of second connecting part 48, end 48a of second connecting part 48 is an end on the far side to first connecting part 46. FIG. 3 depicts a structure in which first connecting part 46 and second connecting part 48 adjacent to each other are shifted from each other by the interval equal to or larger than one power storage device. In a view in second direction Y, therefore, first connecting part 46 overlaps one of two adjacent power storage devices 10 as second connecting part 48 overlaps the other of the same.

First heat transfer member 6a has a plurality of first connecting parts 46 and of second connecting parts 48. The plurality of first connecting parts 46 and second connecting parts 48 are arranged alternately in first direction X. This suppresses a chain of overheating of a greater number of power storage devices 10.

The plurality of first connecting parts 46 are arranged at intervals such that two adjacent first connecting parts 46 sandwich one power storage device 10 therebetween in first direction X. In the same manner, the plurality of second connecting parts 48 are arranged at intervals such that two adjacent second connecting parts 48 sandwich one power storage device 10 therebetween in first direction X. In other words, in a positional relationship between two first connecting parts 46 adjacent to each other in first direction X, an interval (interval L2) between end 46b of one first connecting part 46, end 46b on another first connecting part 46 side, and end 46c of other first connecting part 46, end 46c on one first connecting part 46 side, accommodates one power storage device 10 in a view in second direction Y. In the same manner, in a positional relationship between two second connecting parts 48 adjacent to each other in first direction X, an interval (interval L3) between end 48b of one second connecting part 48, end 48b on another second connecting part 48 side, and end 48c of other second connecting part 48, end 48c on one second connecting part 48 side, accommodates one power storage device 10 in a view in second direction Y.

In this exemplary embodiment, first power storage module 4a and second power storage module 4b each have first surfaces 52 counter to each other. In this exemplary embodiment, first power storage module 4a and second power storage module 4b are arranged in such a way as to set their side surfaces counter to each other. Respective side surfaces of power storage modules 4 are thus equivalent to first surfaces 52. First heat transfer member 6a is composed of plate 54 that extends in the first direction while meandering in a gap between two first surfaces 52. In other words, first heat transfer member 6a has a shape in which projections and recesses are continued in first direction X.

In plate 54, which meanders, a plurality of first parts 56 projecting toward first power storage module 4a make up the plurality of first connecting parts 46, and a plurality of second parts 58 projecting toward second power storage module 4b make up the plurality of second connecting parts 48. Hence heat transfer member 6 of a simple shape can suppress a chain of overheating of power storage devices 10.

In this exemplary embodiment, the plurality of first parts 56 each have a surface parallel with first surface 52 of first power storage module 4a. Likewise, the plurality of second parts 58 each have a surface parallel with first surface 52 of second power storage module 4b. This increases a contact area of each first connecting part 46 and of each second connecting part 48, the contact area being brought into contact with power storage module 4. Each first connecting part 46 overlaps one power storage device 10 in a view in second direction Y. Each second connecting part 48 overlaps one power storage device 10 in a view in second direction Y.

Coupling part 50 extends perpendicularly relative to first direction X. Plate 54, therefore, has a rectangular wave shape in which a cycle of meandering is equivalent to two power storage devices. This increases the contact area of each first connecting part 46 and of each second connecting part 48, the contact area being brought into contact with power storage module 4. Coupling part 50 may extend diagonally relative to first direction X. For example, first part 56 and second part 58 may form trapezoidal projections in a view in the direction perpendicular to first direction X and to second direction Y.

In a case where first heat transfer member 6a having the above structure is disposed between first power storage module 4a and second power storage module 4b, for example, when the temperature of one power storage device 10 of first power storage module 4a rises excessively, at least part of the heat of one power storage device 10 is transferred to another power storage device 10 in the following manner. Specifically, when power storage device 10 generates excessive heat, the heat is first transferred to closest first connecting part 46 that overlaps power storage device 10 in second direction Y.

Subsequently, the heat is transferred from closest first connecting part 46 to second connecting part 48 located next to closest first connecting part 46 in a diagonal direction. Part of the heat having reached second connecting part 48 is transferred to binding member 12 of second power storage module 4b and to power storage device 10 overlapping second connecting part 48 in second direction Y. The other part of the heat having reached second connecting part 48 is transferred to first connecting part 46 located next to second connecting part 48 in a diagonal direction on the far side to power storage device 10 having generated heat. The heat having reached first connecting part 46 on the far side is transferred to binding member 12 of first power storage module 4a and to power storage device 10 overlapping first connecting part 46 in second direction Y. This means that in first power storage module 4a, a flow of heat detours power storage device 10 directly adjacent to power storage device 10 having generated the heat (i.e., first one adjoining power storage device 10 having generated the heat) and reaches power storage device 10 that is second one adjoining power storage device 10 having generated the heat. Through this process, an excessive rise in the temperature of power storage device 10 adjacent to power storage device 10 having generated heat can be suppressed.

Second heat transfer member 6b to fourth heat transfer member 6d each have the same structure as first heat transfer member 6a, and exert the same heat transfer effects as first heat transfer member 6a. Heat transfer effects exerted by second heat transfer member 6b can be described by, in the above description, replacing first power storage module 4a and second power storage module 4b with second power storage module 4b and third power storage module 4c, respectively. Third heat transfer member 6c and fourth heat transfer member 6d each have contact parts in contact with case 2 that are formed intermittently in first direction X. These contact parts, however, may be formed continuously in first direction X.

By interposing heat transfer member 6 between adjacent power storage modules 4 and between power storage module 4 and case body 2a, first connecting parts 46 or second connecting parts 48 can be allocated to all power storage devices 10 of first power storage module 4a to third power storage module 4c. In the case of first power storage module 4a, for example, first connecting parts 46 of first heat transfer member 6a are allocated to power storage devices 10 of first power storage module 4a in one-to-one correspondence, with every power storage device 10 next to corresponding power storage device 10 being skipped. To power storage devices 10 skipped by first heat transfer member 6a in its allocation of first connecting parts 46, second connecting parts 48 of third heat transfer member 6c are allocated in one-to-one correspondence. Thus, all power storage devices 10 of first power storage module 4a can receive the heat transfer effects of first heat transfer member 6a and third heat transfer member 6c.

Paying attention to second power storage module 4b, for example, reveals that second power storage module 4b is sandwiched between first heat transfer member 6a and second heat transfer member 6b. The plurality of second connecting parts 48 of first heat transfer member 6a are thermally connected to one of two surfaces (first surfaces 52) of second power storage module 4b, the two surfaces being parallel with first direction X and counter to each other. The plurality of first connecting parts 46 of second heat transfer member 6b are thermally connected to the other of the two surfaces. The plurality of first connecting parts 46 of second heat transfer member 6b are counter to the plurality of first connecting parts 46 of first heat transfer member 6a across second power storage module 4b. In other words, in a view in second direction Y, first connecting parts 46 of first heat transfer member 6a and first connecting parts 46 of second heat transfer member 6b overlap each other. Similarly, in a view in second direction Y, second connecting parts 48 of first heat transfer member 6a and second connecting parts 48 of second heat transfer member 6b overlap each other. This arrangement applies also to arrangement of first heat transfer member 6a and third heat transfer member 6c relative to first power storage module 4a, and to arrangement of second heat transfer member 6b and fourth heat transfer member 6d relative to third power storage module 4c.

As described above, power storage pack 1 according to this exemplary embodiment includes the plurality of power storage modules 4 each including the plurality of power storage devices 10 arranged in first direction X and binding members 12 that bind the plurality of power storage devices 10, and heat transfer members 6 that transfer heat between the plurality of power storage modules 4. The plurality of power storage modules 4 include at least first power storage module 4a and second power storage module 4b. Among heat transfer members 6, first heat transfer member 6a disposed between first power storage module 4a and second power storage module 4b has first connecting parts 46 thermally connected to the surface of first power storage module 4a, the surface being parallel with first direction X, second connecting parts 48 thermally connected to the surface of second power storage module 4b, the surface being parallel with first direction X, and coupling parts 50 thermally connecting first connecting parts 46 to second connecting parts 48. First connecting parts 46 and second connecting parts 48 are arranged in such a way as to be shifted from each other in first direction X.

First heat transfer member 6a having such a structure forms a heat transfer path between first power storage module 4a and second power storage module 4b, and, in the same power storage module, causes heat to diffuse by detouring power storage device 10 adjacent to overheating power storage device 10. When the temperature of any given power storage device 10 rises excessively, therefore, the heat of power storage device 10 being heavily transferred to adjacent power storage device 10 can be prevented. A chain of overheating is thus suppressed to prevent a decline in the performance of each power storage module 4.

According to this exemplary embodiment, first connecting part 46 and second connecting part 48 are arranged in such a way as to be shifted from each other by the interval equal to or larger than one power storage device. First heat transfer member 6a has the plurality of first connecting parts 46 and of second connecting parts 48, and the plurality of first connecting parts 46 and second connecting parts 48 are lined up alternately in first direction X. The plurality of first connecting parts 46 are arranged at intervals such that two adjacent first connecting parts 46 sandwich one power storage device 10 therebetween in first direction X. The plurality of second connecting parts 48 are arranged at intervals so that two adjacent second connecting parts 48 sandwich one power storage device 10 therebetween in first direction X.

First power storage module 4a and second power storage module 4b each have first surfaces 52 counter to each other. First heat transfer member 6a extends in first direction X while meandering between two first surfaces 52 counter to each other. In this first heat transfer member 6a, the plurality of first parts 56 projecting toward first power storage module 4a make up the plurality of first connecting parts 46, and the plurality of second parts 58 projecting toward second power storage module 4b make up the plurality of second connecting parts 48. The plurality of first parts 56 each have the surface extending parallel with first surface 52 of first power storage module 4a, and the plurality of second parts 58 each have the surface extending parallel with first surface 52 of second power storage module 4b. Coupling part 50 extends perpendicularly relative to first direction X. These constituent elements further suppress a chain of overheating.

Second Exemplary Embodiment

Figure 4:
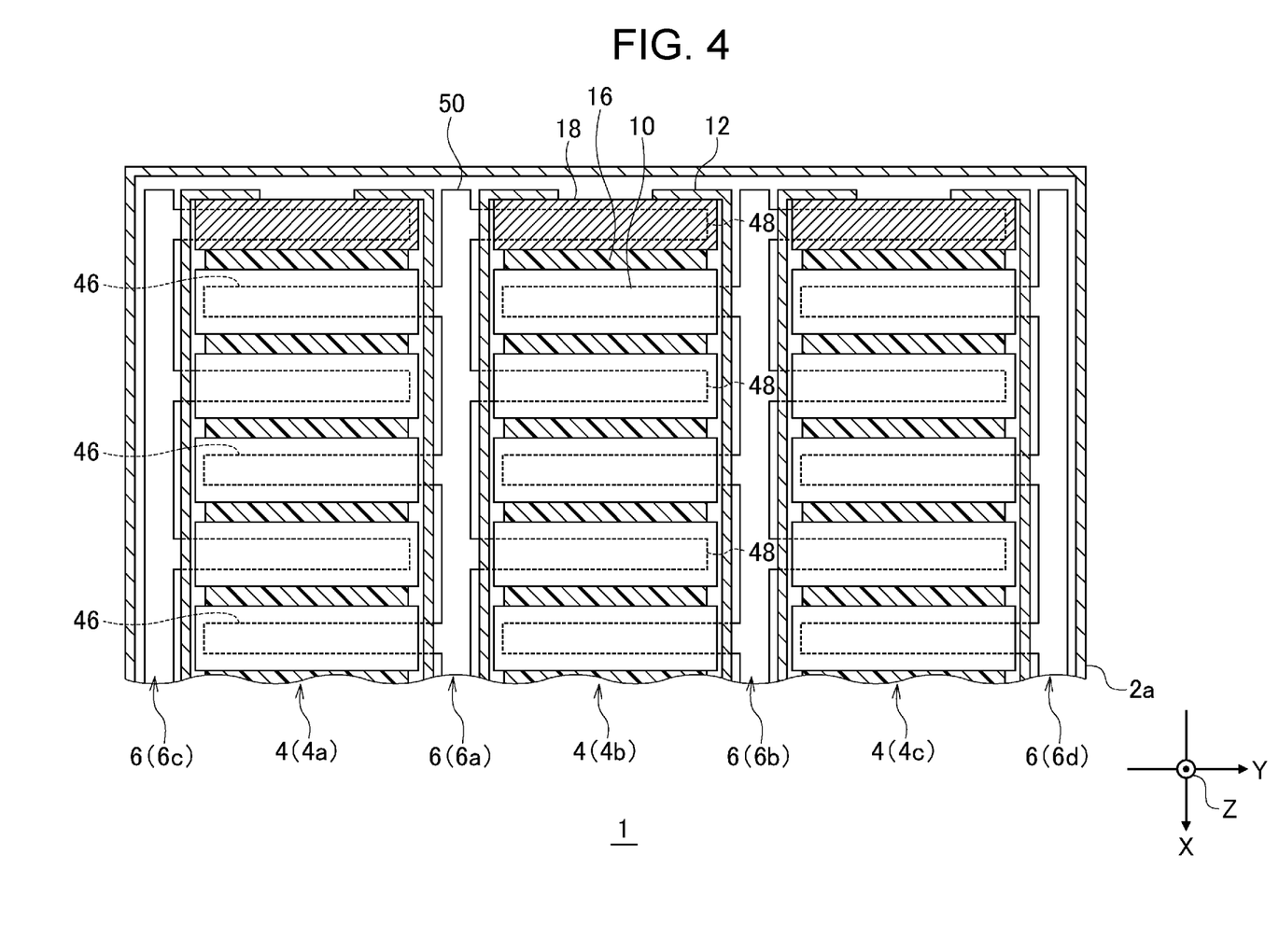
FIG. 4 is a horizontal cross-sectional view of a part of a power storage pack according to a second exemplary embodiment.

A second exemplary embodiment is the same in configuration as the first exemplary embodiment, except the shape and arrangement of heat transfer members 6. Hereinafter, the second exemplary embodiment will be described with focus placed on constituent elements different from those of the first exemplary embodiment, and the same constituent elements will be briefly described or not described. FIG. 4 is a horizontal cross-sectional view of a part of power storage pack 1 according to the second exemplary embodiment. In FIG. 4, the internal structure of power storage devices 10 and separators 16 are illustrated in a simplified manner.

First heat transfer member 6a has first connecting parts 46 thermally connected to first power storage module 4a, second connecting parts 48 thermally connected to second power storage module 4b, and coupling parts 50 thermally coupling first connecting parts 46 to second connecting parts 48. First connecting parts 46 are thermally connected to a surface of first power storage module 4a, the surface being parallel with first direction X. Second connecting parts 48 are thermally (heat-conductively) connected to a surface of second power storage module 4b that is parallel with first direction X. First connecting parts 46 and second connecting parts 48 are arranged in such a way as to be shifted from each other in first direction X. According to this exemplary embodiment, first connecting parts 46 and second connecting parts 48 are arranged in such a way as to be shifted from each other by an interval equal to or larger than one power storage device.

First heat transfer member 6a has a plurality of first connecting parts 46 and of second connecting parts 48. The plurality of first connecting parts 46 and second connecting parts 48 are arranged alternately in first direction X. The plurality of first connecting parts 46 are arranged at intervals such that two adjacent first connecting parts 46 sandwich one power storage device 10 therebetween in first direction X. In the same manner, the plurality of second connecting parts 48 are arranged at intervals such that two adjacent second connecting parts 48 sandwich one power storage device 10 therebetween in first direction X.

First power storage module 4a and second power storage module 4b have second surfaces 60, respectively, which direct the same direction (see FIG. 2). First heat transfer member 6a is disposed in such a way as to overlap respective second surfaces 60 of first power storage module 4a and second power storage module 4b. In this exemplary embodiment, the bottom surfaces of first power storage module 4a and second power storage module 4b correspond to second surfaces 60, and first heat transfer member 6a overlaps respective bottom surfaces of power storage modules 4 in third direction Z. It is preferable that first heat transfer member 6a be disposed in such a way as to be in contact with the bottom surface of each power storage module 4. First heat transfer member 6a, however, may be disposed on the top surface side of each power storage module 4.

Heat transfer member 6 is disposed between each power storage module 4 and cooling plate 8, so that heat from each power storage module 4 transfers to cooling plate 8 via heat transfer member 6. Heat transfer member 6 may be fixed to second surface 60 of each power storage module 4 or to cooling plate 8. Heat transfer member 6 may be fixed to case 2 without interposing cooling plate 8 between heat transfer member 6 and case 2.

Coupling part 50 is formed of a plate elongated in first direction X, and in a view in third direction Z in which first heat transfer member 6a and second surface 60 overlap with each other, extends in first direction X between first power storage module 4a and second power storage module 4b. Each of the plurality of first connecting parts 46 is formed of a plate elongated in second direction Y, and projects from coupling part 50 toward first power storage module 4a. Each of the plurality of second connecting parts 48 is formed of a plate elongated in second direction Y, and projects from coupling part 50 toward second power storage module 4b. In short, first heat transfer member 6a is a comb-teeth-like plate in which a plurality of teeth project from both sides of coupling part 50 in second direction Y. First connecting parts 46, second connecting parts 48, and coupling part 50 are formed integrally.

In this exemplary embodiment, the plurality of first connecting parts 46 each have a surface parallel with second surface 60 of first power storage module 4a. Likewise, the plurality of second connecting parts 48 each have a surface parallel with second surface 60 of second power storage module 4b. This increases a contact area of each first connecting part 46 and of each second connecting part 48, the contact area being brought into contact with power storage module 4. Each first connecting part 46 has a width (size in first direction X) corresponding to the width of one power storage device 10 in a view in third direction Z. Each second connecting part 48 has a width corresponding to the width of one power storage device, and overlaps one power storage device 10 in a view in third direction Z. Heat transfer member 6 of this exemplary embodiment offers the same effects as heat transfer member 6 of the first exemplary embodiment.

Second heat transfer member 6b to fourth heat transfer member 6d each have the same structure as first heat transfer member 6a, and exert the same heat transfer effects as first heat transfer member 6a. Heat transfer effects exerted by second heat transfer member 6b can be described by, in the above description, replacing first power storage module 4a and second power storage module 4b with second power storage module 4b and third power storage module 4c, respectively, or, in FIG. 4, regarding second power storage module 4b and third power storage module 4c as first power storage module 4a and second power storage module 4b, respectively.

Third heat transfer member 6c has only connecting parts projecting from coupling part 50 toward first power storage module 4a. Likewise, fourth heat transfer member 6d has only connecting parts projecting from coupling part 50 toward third power storage module 4c. However, the configuration of third heat transfer member 6c and fourth heat transfer member 6d is not limited to the above configuration, and they may have connecting parts projecting toward case body 2a and thermally connected thereto. By interposing heat transfer member 6 between adjacent power storage modules 4 and between power storage module 4 and case body 2a, first connecting parts 46 or second connecting parts 48 can be allocated to all power storage devices 10 of first power storage module 4a to third power storage module 4c.

Paying attention to second power storage module 4b, for example, reveals that the plurality of second connecting parts 48 of first heat transfer member 6a are thermally connected to some of power storage devices 10 of second power storage module 4b. The plurality of first connecting parts 46 of second heat transfer member 6b are thermally connected to some other power storage devices 10. It is preferable that all of power storage devices 10 not thermally connected to second connecting parts 48 of first heat transfer member 6a be thermally connected to first connecting parts 46 of second heat transfer member 6b. The plurality of first connecting parts 46 of second heat transfer member 6b are counter to the plurality of first connecting parts 46 of first heat transfer member 6a across coupling part 50 of first heat transfer member 6a. In other words, in a view in second direction Y, first connecting parts 46 of first heat transfer member 6a and first connecting parts 46 of second heat transfer member 6b overlap each other. Similarly, in a view in second direction Y, second connecting parts 48 of first heat transfer member 6a and second connecting parts 48 of second heat transfer member 6b overlap each other. This arrangement applies also to arrangement of first heat transfer member 6a and third heat transfer member 6c relative to first power storage module 4a, and to arrangement of second heat transfer member 6b and fourth heat transfer member 6d relative to third power storage module 4c.

The exemplary embodiments of the present disclosure have been described in detail above. The above-described exemplary embodiments are merely specific examples of implementing the present disclosure. The contents of the exemplary embodiments do not put limits on the technical scope of the present disclosure, and may be modified or changed in the form of modifications, additions, deletions, etc., of configuration elements, according to a designed concept without departing from the spirit of the invention defined in the claims. Any new exemplary embodiment resulting from a change or modification according to the designed concept offers effects of an exemplary embodiment and a modification that are combined with the new exemplary embodiment. In the above-described exemplary embodiments, what can be changed or modified according to the designed concept is emphasized by such phrases as "of the present exemplary embodiment" and "in the present exemplary embodiment". However, contents not expressed by such phrases may also be changed or modified according to the designed concept. Furthermore, any combination of constituent elements included in the exemplary embodiments is also effective as an aspect of the present disclosure. Hatching made on cross sections in the drawings are not intended for limiting the material of a constituent element depicted in the drawing as a hatched object.

Figure 5:
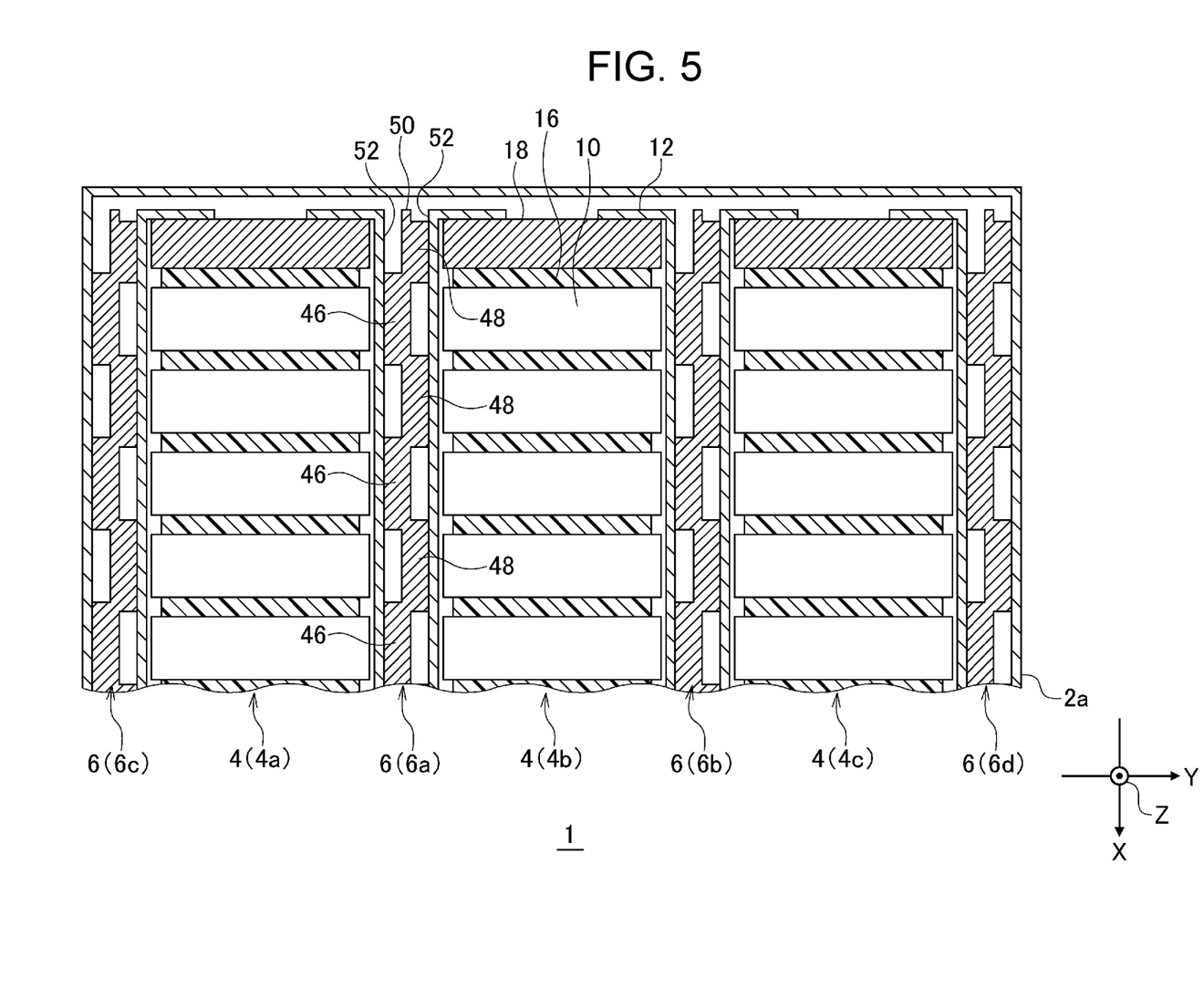
FIG. 5 is a horizontal cross-sectional view of a part of a power storage pack according to a modified example.

In the first exemplary embodiment, first connecting parts 46, second connecting parts 48, and coupling part 50 are configured as constituent elements of the plate in the meandering form. Their configuration, however, is not limited to this. FIG. 5 is a horizontal cross-sectional view of a part of power storage pack 1 according to a modified example. First heat transfer member 6a included in power storage pack 1 according to this modified example has plate-like connecting portion 50 extending in first direction X along first surface 52 of power storage module 4, first connecting parts 46 each composed of a projection projecting from a surface of coupling part 50, the surface facing first power storage module 4a, toward first power storage module 4a, and second connecting parts 48 each composed of a projection projecting from a surface of coupling part 50, the surface facing second power storage module 4b, toward second power storage module 4b. Second heat transfer member 6b to fourth heat transfer member 6d each have the same structure as first heat transfer member 6a. According to this structure, the cross-sectional area of a path for heat transferring in heat transfer member 6 can be easily increased.

It is preferable that heat transfer member 6 be provided for all power storage modules 4. Heat transfer member 6, however, may be provided for only some of power storage modules 4. The number of power storage devices 10 included in power storage module 4 is not limited to a specific number. The structure of each component making up power storage module 4, such as the structure of end plate 18 and that of binding member 12, is not limited to a specific structure.

REFERENCE MARKS IN THE DRAWINGS 1 power storage pack
4 power storage module
4a first power storage module
4b second power storage module
6 heat transfer member
10 power storage device
12 binding member
46 first connecting part
48 second connecting part
50 coupling part

The invention claimed is:

1. A power storage pack comprising:
a plurality of power storage modules, the power storage modules each including a plurality of power storage devices arranged in a first direction and a binding member that binds the plurality of power storage devices; and
a heat transfer member that transfers heat between the plurality of power storage modules,
wherein the plurality of power storage modules includes at least a first power storage module and a second power storage module,
the heat transfer member includes:
a first connecting part thermally connected to a surface of the first power storage module, the surface being parallel with the first direction;
a second connecting part thermally connected to a surface of the second power storage module, the surface being parallel with the first direction; and
a coupling part thermally connecting the first connecting part to the second connecting part, and
the first connecting part and the second connecting part are arranged while being shifted from each other in the first direction, and
wherein the heat transfer member includes a plurality of a first connecting parts each being the first connection part and a plurality of a second connecting parts each being the second connection part,
the plurality of first connecting parts and the plurality of second connecting parts are lined up alternately in the first direction,
the first power storage module and the second power storage module include second surfaces, respectively, the second surfaces directing a same direction,
the heat transfer member is disposed to overlap two of the second surfaces,
the coupling part extends in the first direction between the first power storage module and the second power storage module in a view in a direction in which the heat transfer member and the second surfaces overlap each other,
the plurality of first connecting parts project from the coupling part toward the first power storage module and are connected to the second surface of the first power storage module, and
the plurality of second connecting parts project from the coupling part toward the second power storage module and are connected to the second surface of the second power storage module.

2. The power storage pack according to claim 1, wherein the first connecting part and the second connecting part are arranged while being shifted from each other by an interval equal to or more than one of the plurality of power storage devices.

3. The power storage pack according to claim 1, wherein
the plurality of first connecting parts are arranged at intervals to cause two of the first connecting parts adjacent to each other to sandwich one of the plurality of power storage devices in the first direction; and
the plurality of second connecting parts are arranged at intervals to cause two of the second connecting parts adjacent to each other to sandwich one of the plurality of power storage devices in the first direction.

4. The power storage pack according to claim 1, wherein
the first power storage module and the second power storage module each include first surfaces counter to each other, and
between two of the first surfaces, the heat transfer member extends in the first direction while meandering, and a plurality of first parts projecting toward the first power storage module constitute a plurality of the first connecting parts as a plurality of second parts projecting toward the second power storage module constitute a plurality of the second connecting parts.

5. The power storage pack according to claim 4, wherein
the plurality of first parts each include a surface parallel with the first surface of the first power storage module, and
the plurality of second parts each include a surface parallel with the first surface of the second power storage module.

6. The power storage pack according to claim 4, wherein the coupling part extends perpendicularly relative to the first direction.

7. The power storage pack according to claim 4, comprising a plurality of the heat transfer members including at least a first heat transfer member and a second heat transfer member,
wherein the second power storage module is sandwiched between the first heat transfer member and the second heat transfer member,
a plurality of the second connecting parts of the first heat transfer member are thermally connected to one of two surfaces of the second power storage module, the two surfaces being parallel with the first direction and counter to each other, and
a plurality of the first connecting parts of the second heat transfer member are thermally connected to another of the two surfaces, and are counter to a plurality of the first connecting parts of the first heat transfer member across the second power storage module.

8. The power storage pack according to claim 1, wherein
the plurality of first connecting parts each include a surface parallel with the second surface of the first power storage module, and
the plurality of second connecting parts each include a surface parallel with the second surface of the second power storage module.

9. The power storage pack according to claim 1, comprising a plurality of the heat transfer members including at least a first heat transfer member and a second heat transfer member,
wherein a plurality of the second connecting parts of the first heat transfer member are thermally connected to some of the plurality of power storage devices of the second power storage module, and a plurality of the first connecting parts of the second heat transfer member are thermally connected to others of the plurality of power storage devices of the second power storage module, and are counter to the first connecting part of the first heat transfer member across the connecting part of the first heat transfer member.

10. The power storage pack according to claim 1, wherein the binding member includes a body extending in the first direction and a through-hole, a recess, or a gap provided in the body, and a part of the heat transfer member is fitted in the through-hole, the recess, or the gap.

\* \* \* \* \*